Patented Apr. 8, 1952

2,591,670

UNITED STATES PATENT OFFICE 2,591,670

PRODUCTION OF FILAMENTS FROM ACRYLONITRILE - 2 - METHALLYL ALCOHOL POLYMER

John R. Caldwell, Kingsport, Tenn., assignor to Eastman Kodak Company, Rochester, N. Y., a corporation of New Jersey No Drawing. Application March 23, 1948, Serial No. 16,624

3 Claims. (Cl. 18—54)

This invention relates to processes for the production of filaments by the dry or wet spinning of acrylonitrile-2-methyallyl alcohol polymers and to solutions of these polymers adapted for use in the production of filaments by such processes.

Polyacrylonitrile and copolymers of acrylonitrile with other polymerizable substances, for example vinyl or acrylic compounds, in which at least 85% by weight of the polymer is acrylonitrile have been known for some time and recognized as possessing desirable physical and chemical properties, including toughness and insolubility in, and insensitivity to, common organic solvents, such as methyl or ethyl alcohol, acetone, ethyl ether, ethyl acetate, hydrocarbon solvents, chlorinated hydrocarbons, etc. Numerous efforts have been made to employ these polymeric materials for the production of filaments, but these efforts have met with little success because of the extreme insolubility of the polymeric material in ordinary solvents such as those mentioned above.

For example, H. Rein, in U. S. Patent 2,140,921, issued December 20, 1938, states that concentrated aqueous solutions of inorganic salts such as lithium bromide, zinc chloride and sodium sulfocyanide would dissolve polyacrylonitrile. It is suggested that such solutions could be used for the production of filamentary materials, but in practice it has been found that such solutions are not susceptible of being successfully employed in this manner. For example, when such solutions are extruded into coagulating baths such as water, dilute acid, dilute salt solutions, etc., the resulting filaments are found to contain large amounts of inorganic salts distributed throughout the structure of the material. This destroys the continuity of the polyacrylonitrile phase and gives the filament structure poor physical properties. Even in those cases where it is possible to remove these inorganic salts, a porous, spongy, weak, brittle, undesirable filament structure results.

C. Tobis, United States Patent 2,167,537, dated July 25, 1939, points out that certain copolymers of acrylonitrile and an acrylic acid ester (those containing not more than 65% of acrylonitrile) are soluble in a mixture of dioxane, monochlorobenzene cyclohexanone, dichloroethyl ether and ethylene glycol diacetate. However, such copolymers containing up to only 65% of acrylonitrile are not possessed of the especially desirable properties of polyacrylonitrile and of copolymers containing at least 85% by weight of acrylonitrile.

It has also been proposed by H. Rein, United States Patent 2,117,210, dated May 10, 1938, to dissolve polyacrylonitrile in molten quaternary ammonium salts, e. g. pyridine benzyl chloride, an ionizable salt. Such solutions are not satisfactory for the production of commercially useful shaped articles of polyacrylonitrile. Films or filaments made from such solutions are extremely brittle, highly colored and very weak, probably because of the presence of residual quaternary salt. Removal of the salt is difficult and results in articles substantially useless for commerical purposes.

More recently, G. H. Latham (United States Patent 2,404,714, dated July 23, 1946) has proposed to dissolve polymers of acrylonitrile containing in the polymer molecule at least 85% by weight of acrylonitrile in a dimethyl carbonyl compound such as N,N-dimethylformamide, N,N,N'N8 - α - pentamethyl-α-cyanosuccinamide, N,N,N',N'-tetramethylglutaramide, etc. From solutions in these compounds the polymers of acrylonitrile can be extruded through a spinneret into a tubular cell, the solvent evaporated and the monofilament spun to a yarn. However, since the aforesaid solvents have high boiling points, high temperatures are required to evaporate the solvent, e. g. 400° C. Obviously, such high temperatures have an extremely adverse effect on the filamentary material.

As set forth in my copending application, filed of even date now U. S. Patent No. 2,525,521, patented October 10, 1950, I have found that acrylonitrile and 2-methallyl alcohol can be copolymerized and that the resulting copolymers, even when containing as much as 85% by weight of acrylonitrile, are readily soluble in volatile solvents, such as acetone and acetonitrile and that the resulting solutions can be readily spun to give exceptionally high quality filaments by either the dry or wet spinning methods. This is particularly surprising in view of the fact that the prior art shows that polymers containing as much as 85% of acrylonitrile are soluble only in high boiling solvents such as dimethyl formamide, ethylene cyanohydrin and the like which are wholly unsuitable for use in the production of filaments by comercially acceptable spinning prodcedures.

This invention has as an object to provide a process for the spinning of filamentary material, by either the wet or dry spinning procedures, in which acrylonitrile-2-methallyl alcohol polymers may be employed as the filament-forming material. Another object is to provide a dry spinning process in which acrylonitrile-2-methallyl alcohol polymers may be spun from solution in volatile solvents and at moderately elevated temperatures below a temperature which would have an adverse effect upon the polymeric material. A further object is to provide spinning solutions adapted for the production of high-quality filaments by either the dry or wet spinning procedures from acrylonitrile-2-methallyl alcohol. A still further object is to provide solutions adapted for use in the dry spinning of acrylonitrile-2-methallyl alcohol polymers in which the polymeric material is dissolved in relatively volatile solvents. Other objects will appear hereinafter.

These objects are accomplished by the following invention which is based upon the discovery that acrylonitrile-2-methallyl alcohol polymers may be dissolved in volatile solvents, that is, solvents such as acetone, acetonitrile or mixtures of these solvents with water and other materials. In carrying out my invention, while I may produce satisfactory filaments by the wet spinning method and in some cases may employ high boiling solvents, I prefer to employ the dry spinning method and for this purpose I employ solutions of the copolymers in volatile solvents such as acetone or acetonitrile, which may also contain a certain proportion of water. I have also found that in order to obtain maximum tensile strength and elasticity, the filaments, whether wet or dry spun, must be subjected to a drafting or stretching process after they have been spun to orient the molecules of the polymeric materials parallel with the fiber axis. I have also found that the hot water shrinkage of the acrylonitrile-2-methallyl alcohol polymer filaments can be appreciably reduced by suitable heat treatments after the drafting process.

In the following examples and description, I have set forth several of the preferred embodiments of my invention, but they are included merely for purposes of illustration and not as a limitation thereof.

The copolymers employed in accordance with the present invention may be prepared by polymerizing a mixture of monomeric acrylonitrile and monomeric 2-methallyl alcohol. The polymerization is advantageously carried out in the presence of a polymerization catalyst, e. g. a peroxide polymerization catalyst. Peroxide polymerization catalysts which are soluble in the mixture of the monomers can be employed, e. g. organic peroxides, for instance benzoyl peroxide, acetal peroxide, lauroyl peroxide, tertiary butyl hydroperoxide, etc. Water soluble peroxides can also be used, e. g. hydrogen peroxide, ammonium persulfate, potassium persulfate, sodium persulfate, persulfuric acid, the water-soluble salts of percarbonic acid, the water-soluble salts of perphosphoric acid, the water-soluble salts of sulfo-per-acid (Caro's acid). As water-soluble salts, the ammonium, potassium and sodium salts are especially suitable. Mixtures of the catalysts can be employed.

The polymerizations can be carried out in bulk (mass), in solvents or in heterogeneous dispersion where the mixture of monomers is dispersed in a non-solvent for the monomers, the particles of dispersed monomers being very small (emulsion) or relatively large (bead or granular). In bulk or mass polymerization, the organic peroxide catalysts are advantageously employed. In solvent polymerization, the organic peroxide catalysts are also advantageously employed. Suitable solvents include acetone, methyl ethyl ketone, methyl alcohol, ethyl alcohol, n-propyl alcohol, isopropyl alcohol, tertiary butyl alcohol, 1,4-dioxane, chloroform, carbon tetrachloride, naphtha (liquid saturated aliphatic hydrocarbons boiling from 60 to 100° C.), benzene, etc. Mixtures of solvents can be employed.

For emulsion polymerization, any non-solvent for the mixture of monomers can be employed, water being especially advantageous. The mixture of monomers can be advantageously emulsified in the water, using emulsifying agents, such as salts of higher fatty acids, e. g. sodium or potassium stearate, palmitate, etc. or ordinary soaps, salts of higher fatty alcohol sulfates, e. g. sodium or potassium cetyl sulfate, sodium or potassium lauryl sulfate, sodium or potassium oleyl alcohol, sodium or potassium stearyl alcohol, etc., salts of aromatic sulfonic acids, e. g. the sodium or potassium salts of alkylnaphthene sulfonic acids, etc., higher molecular weight quaternary ammonium salts, e. g. dimethylbenzylphenylammonium chloride, quaternary ammonium salts containing the radicals $C_{15}H_{31}$ and $C_{17}H_{35}$, etc. Mixtures of emulsifying agents can be employed.

For bead or granular polymerization relatively poor dispersing agents, such as starch, methylated starch, gum arabic, gum acacia, polyvinyl alcohol, partly hydrolyzed polyvinyl acetate, gelatin, sodium cellulose glycolate, etc. can be employed. Mixtures of dispersing agents can be employed.

In the polymerizations wherein the mixture of monomers is dispersed in a non-solvent, the dispersion of the mixture of monomers can be facilitated by stirring, shaking or tumbling the mixture of monomers and non-solvent. In emulsion polymerization the water-soluble polymerization catalysts are advantageously employed. Heat accelerates all the polymerizations.

The mixture of monomeric acrylonitrile and 2-methallyl alcohol advantageously contains from 2 to 40% by weight of 2-methallyl alcohol, the remainder of the monomeric polymerizable compound being acrylonitrile. The most useful copolymers are obtained from mixtures of acrylonitrile and 2-methallyl alcohol containing from 10 to 40% by weight of 2-methallyl alcohol. Those mixtures containing from 15 to 30% by weight of 2-methallyl alcohol give copolymers which are especially useful for preparing filaments. The proportion of 2-methallyl alcohol employed in the monomeric mixture has been found to be substantially the same in the polymeric material made from such a mixture in accordance with my invention.

Other copolymers can likewise be prepared, for example, from monomeric mixtures containing 2% by weight of 2-methallyl alcohol, 5% by weight of 2-methallyl alcohol, 15% by weight of 2-methallyl alcohol, 20% by weight of 2-methallyl alcohol, 30% by weight of 2-methallyl alcohol, 35% by weight of 2-methallyl alcohol and 40% by weight of 2-methallyl alcohol, the remainder being acrylonitrile in each case.

The copolymers made from monomeric mixtures containing from 15 to 30% by weight of 2-methallyl alcohol are soluble in a mixture of 90% by weight of acetone and 10% water, or in a mixture of 90% by weight of acetonitrile and 10% of water.

As indicated above, once the filaments are obtained by either the dry or wet spinning procedure, in order to obtain maximum tensile strength and elasticity, in accordance with my invention, they are, subjected to a drafting or stretching process. This results in orienting the molecules of the polymeric material parallel with the filament axis. This procedure may be carried out in various ways. When the filaments are spun by the wet spinning method, it is convenient to pass them, while still wet with liquid from the coagulating bath, through a steam chamber or a hot water bath during the stretching process, which may be carried out by having the filaments wound on a roll located at some distance from the spinneret and operating at peripheral velocity in excess of the linear speed of extrusion of the spinning solution. On the other hand, the filaments can be dried first and then subjected to a stretching operation by first being passed through a hot air or steam chamber and then subjected to drafting.

I have found that the hot water shrinkage of acrylonitrile-2-methallyl alcohol copolymer filaments can be appreciably reduced by suitable heat treatments after the drafting process. For example, the drafted filaments may be held under tension and heated from about 60° C. up to about 120° C. for a period of about 15 minutes. They are then heated for about one minute from about 180° to 200° C. This heat treatment stabilizes the copolymer material so that it shows only 3% to 5% shrinkage in boiling water. The heat treatment can be carried out in either a continuous or discontinuous manner.

My invention will be more fully understood by reference to the following typical examples of the spinning of representative acrylonitrile-2-methallyl alcohol copolymers.

*Example I*

A polymer is prepared from the following materials.

| | | |
|---|---|---|
| Acrylonitrile | g. | 45 |
| Methallyl alcohol | g. | 15 |
| Sulfonated mineral oil | g. | 2.0 |
| Potassium persulfate | g. | 0.1 |
| Water | cc. | 200 |

The mixture is tumbled at 50° C. for 48 hours to give a stable emulsion. The emulsion is coagulated with sodium sulfate and the product is washed and dried. A yield of 48 g. resin analyzing 78% acrylonitrile—22% methallyl alcohol is obtained.

Twenty parts of the resin are dissolved in 72 parts acetone + 8 parts water to give a clear, smooth dope. The dope is pumped to a suitable spinning cabinet, such as one of the general type illustrated in Stone Patents 2,000,047 and 2,000,048 and thence through a 20-hole spinneret. Air is fed to the bottom of the cabinet at such a temperature as to give a temperature in the cabinet of about 100 to 110° C. The filaments may be collected on a bobbin located at the bottom of the cabinets or outside of the cabinet, as desired. At this stage the filaments are relatively weak and show 40 to 50% shrinkage in hot water.

The yarn is then drafted by passing over a feed roll at a speed of ten yards per minute, through a steam chamber maintained at approximately 90° C. and then over a second feed roll at a speed of fifty yards per minute. The drafted yarn is then wound on a bobbin, the bobbin is placed in an oven maintained at approximately 60° C. and the temperature raised to 120° C. The yarn is subjected to this 120° temperature for a period of thirty minutes. The heat-treated yarn shows a hot water shrinkage of about 20%. The bobbin is then placed in an oil bath heated to 180° C. for two minutes. After this treatment the finished yarn shows the following properties when tested dry: tensile strength 3.2 g./d., 18% stretch, 5% shrink in hot water. The material has excellent elastic recovery.

*Example II*

A polymer is prepared from the following materials.

| | | |
|---|---|---|
| Acrylonitrile | g. | 50 |
| Methallyl alcohol | g. | 10 |
| Polyethylene glycol monooleate | g. | 1.0 |
| Potassium persulfate | g. | 0.2 |
| Water | cc. | 200 |

The mixture is tumbled 48 hours at 50° C. to give a stable emulsion. The product is coagulated, washed, and dried to yield 48 g. resin that contains 84% acrylonitrile—16% methallyl alcohol.

Twenty parts of the resin are dissolved in 72 parts acetonitrile + 8 parts water. The dope is spun by the dry-spinning method, as outlined in Example I above. The yarn is drafted 400% in mineral oil heated to 140 to 150° C., then passed through mineral oil at 180 to 190° C. The yarn shows the following properties: 3.6 g./d., 21% stretch, 4% shrink in hot water.

*Example III*

Twenty parts of a resin containing 85% acrylonitrile-15% methallyl alcohol are dissolved in 72 parts acetonitrile + 8 parts water. The dope is extruded through a spinneret into a bath composed of 50% ter-butyl alcohol + 50% water. The yarn is drafted 500% in a water bath heated to 80 to 90° C. and passed through a drying chamber under tension. After drying, the yarn is passed into mineral oil at 120° C. then into mineral oil at 175° C. The yarn has the following properties: 2.9 g./d., 28% stretch, 6% hot water shrink.

It will thus be seen that I have provided a rather unusual advance in the art of filament production by making it possible to employ acrylonitrile polymers which are soluble in volatile solvents and in providing spinning solutions from such polymers dissolved in these volatile materials. The unusual and unexpected character of my invention will be apparent when the fact is taken into consideration that acrylonitrile polymers, in general, as indicated in the above discussion of the prior art, are wholly unsuitable for the production of filaments because of their low solubility in any practically acceptable volatile solvent or solvent combination and because of the fact that such materials in general give filaments and yarns which are porous, spongy, weak or brittle or have a discontinuous structure because of the presence therein of inorganic salts. In other words, by my invention I am enabled to take advantage of the desirable properties of copolymers of the type in question without at the same time encountering the heretofore nearly insuperable obstacles inherent in prior art processes and spinning solutions.

While in the above examples acetone and acetonitrile have been emphasized as the solvents, since these are relatively well known and readily obtainable it should not be overlooked that other solvents may be employed. For example, the not so well known solvents tetrahydrofuran, glycol formal, and the like are operative and useful. It will be further observed that the use of 10-15% water with certain of the solvents may be advantageous. Dimethyl formamide or gamma-valerolactone may, for example, be employed in partial or complete replacement for water in wet spinning and since the latter are relatively nonvolatile would be confined to such type of use. Other changes will be apparent; hence, certain of the foregoing is to be considered as illustrative.

What I claim is:

1. A solution adapted for the spinning of filamentary material composed of 10–25% of an acrylonitrile-2-methallyl alcohol copolymer containing 8% to 30% of methallyl alcohol and 90% to 75% of a volatile solvent selected from the group consisting of acetone and acetonitrile.

2. A spinning solution adapted for the spinning of filamentary material essentially comprised of a copolymer of 15 to 30% of 2-methallyl alcohol, the balance of the copolymer being acrylonitrile, said copolymers being dissolved in a solvent comprised of at least 85% acetone whereby said spinning solution is obtained.

3. A spinning solution adapted for the spinning of filamentary material consisting of a copolymer dissolved in acetonitrile solvent, said copolymer being comprised of 2 to 30% 2-methallyl alcohol, the balance of the copolymer being acrylonitrile, said solvent being comprised at least 85% of acetonitrile.

JOHN R. CALDWELL.

REFERENCES CITED

The following references are of record in the file of this patent:

UNITED STATES PATENTS

| Number | Name | Date |
|---|---|---|
| 2,445,042 | Silverman | July 13, 1948 |

FOREIGN PATENTS

| Number | Country | Date |
|---|---|---|
| 883,551 | France | July 8, 1943 |